United States Patent [19]

Plenge et al.

[11] Patent Number: 5,659,660
[45] Date of Patent: Aug. 19, 1997

[54] METHOD OF TRANSMITTING AND/OR STORING DIGITIZED, DATA-REDUCED AUDIO SIGNALS

[75] Inventors: George Plenge, Thanning; Detlef Wiese, Hallbergmoos; Martin Link, Munich, all of Germany

[73] Assignee: Institut fuer Rundfunktechnik GmbH, Munich, Germany

[21] Appl. No.: 313,255

[22] PCT Filed: Mar. 22, 1993

[86] PCT No.: PCT/EP93/00690

§ 371 Date: Jan. 3, 1995

§ 102(e) Date: Jan. 3, 1995

[87] PCT Pub. No.: WO93/21694

PCT Pub. Date: Oct. 28, 1993

[30] Foreign Application Priority Data

Apr. 9, 1992 [DE] Germany ............. 42 11 945.6

[51] Int. Cl.[6] .................................................. G10L 9/00
[52] U.S. Cl. ............... 395/2.29; 395/2.1; 395/2.14; 395/2.22; 395/2.21
[58] Field of Search ...................... 395/2.2, 2.21, 395/2.22, 2.14, 2.29; 381/34

[56] References Cited

U.S. PATENT DOCUMENTS

| | | | |
|---|---|---|---|
| 3,023,277 | 2/1962 | Mathews | 395/2.2 |
| 3,621,397 | 11/1971 | Kanagawa et al. | 395/2.21 |
| 4,038,495 | 7/1977 | White | 395/2.29 |
| 4,370,643 | 1/1983 | Kitamura | 395/2.21 |
| 4,546,342 | 10/1985 | Weaver et al. | 341/51 |
| 4,821,260 | 4/1989 | Klank et al. | 370/345 |
| 4,882,754 | 11/1989 | Weaver et al. | 395/2.1 |
| 4,942,607 | 7/1990 | Schröder et al. | 395/2.12 |
| 5,115,469 | 5/1992 | Taniguchi et al. | 381/34 |
| 5,179,623 | 1/1993 | Dickopp et al. | 395/2.09 |

FOREIGN PATENT DOCUMENTS

| | | | |
|---|---|---|---|
| 0193143 A2 | 9/1986 | European Pat. Off. | H04B 1/66 |
| 0290581 B1 | 11/1988 | European Pat. Off. | H04B 1/66 |
| 0376553A2 | 7/1990 | European Pat. Off. | |
| 3629434 A1 | 3/1988 | Germany | H03M 1/00 |

OTHER PUBLICATIONS

Lee, Francis F. ("Time Compression and Expansion of Speech by the sampling Method", 42nd Convention of the Audio engineering society, pp. 738–742, May, 1972). May 4, 1972.

Primary Examiner—Allen R. MacDonald
Assistant Examiner—Vijay B. Chawan
Attorney, Agent, or Firm—Spencer & Frank

[57] ABSTRACT

A method of encoding an audio signal for transmission and/or for storage includes changing a digitized audio signal based on a selected signal changing criteria. The changed digitized audio signal is encoded, based at least on an available data rate for transmitting and/or storing the audio signal, for reducing an amount of data associated with the changed, digitized audio signal. The reduced-data audio signal is then evaluated for determining whether a code overload condition exists. If a code overload condition exists, another signal changing criteria is selected. A time behavior and/or a spectral distribution of the digitized audio signal is recursively changed based on the another signal changing criteria before the amount of data associated with the digitized audio signal is reduced so that deterioration of reduced-data audio signal is not perceptible when the coded signal is decoded. The recursively changed digitized audio signal is encoded for reducing an amount of data associated with the recursively changed digitized audio signal based at least on the available data rate. Lastly, the recursively changed encoded reduced-data digitized audio signal is transmitted and/or stored.

10 Claims, 1 Drawing Sheet

METHOD OF TRANSMITTING AND/OR STORING DIGITIZED, DATA-REDUCED AUDIO SIGNALS

BACKGROUND OF THE INVENTION

1. Field of the Invention

The invention relates to a method of transmitting and/or storing digitized, data-reduced audio signals. Such a method is known, for instance, from the European patent specification 290 581.

2. Description of the Related Art

In a bit rate-reduced encoding of audio signals that are already available in a digitized form, e.g., having a 48 kHz scanning frequency/16 bit resolution, utilization of psychoacoustic phenomena in the perception of audio signals is known from EP 290 581 in a way that the original bit rate is considerably reduced. Such methods carrying out transcoding from a higher to a lower bit rate are commonly known as source coding. They particularly utilize masking effects of the ear in the frequency and time domain. It is the object of these methods to not change, if possible, the audible quality which the audio signal has before transcoding (source coding) by reducing the bit rate (optimum transcoding).

In many applications, there is a limited data capacity available for transmission or storage. If this bit rate, which is made available, is insufficient, a further data reduction according to the principles of optimum transcoding leads to sometimes considerable interference, especially in the form of considerable sound distortions. This same interference, of course, also occurs if the source coding is not two-staged, but takes place in one step.

Furthermore, in a method of transmitting and/or storing digitized, data-reduced audio signals it is known (DE 36 29 434 A1) to let further encoding steps follow if, after encoding, a predetermined bit rate is exceeded (code overload), until the actual bit rate no longer exceeds the designated bit rate. That is, if code overload exists after a first encoding sep, further encoding steps can be employed. However, this approach does not always avoid a code overload with certainty.

SUMMARY OF THE INVENTION

In contrast, it is the object of the present invention to minimize the interference or distortion effect during a further data reduction of an already data-reduced audio signal or during a first data reduction of an audio signal, while accepting code violations.

This object is provided by the present invention so that in the event of a code overload, before the audio signal is encoded, the time behavior and/or the spectral distribution of the audio signal is changed according to a selected adaptation pattern without a considerable signal deterioration being subjectively perceivable after decoding the encoded audio signal.

Advantageous modifications of the solutions according to the invention are described as follows.

BRIEF DESCRIPTION OF THE DRAWING

By way of an embodiment, the invention is explained in greater detail in the only drawing. It shows.

DETAILED DESCRIPTION OF THE PREFERRED EMBODIMENTS

Figure 1:
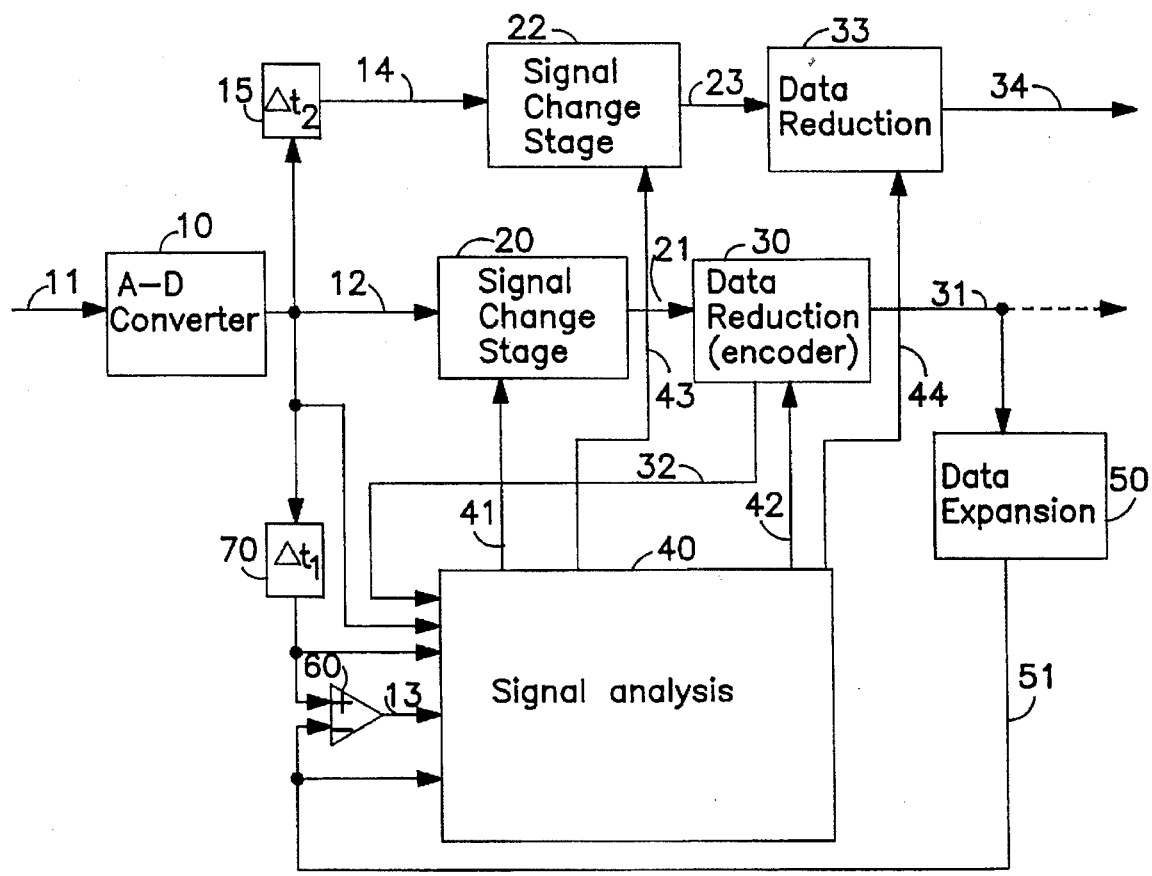
FIG. 1 is a block diagram of an encoder for the implementation of the method according to the invention.

In the encoder shown in FIG. 1, the arriving analog audio signal 11 is fed to an analog/digital conversion stage 10. The analog signal 11 has various signal features, such as a spectral distribution and a time behavior (or behavior during the course of time). The digitized audio signal 12 is fed to a stage 40, to be explained later, for signal analysis, to a signal change stage 20, as well as to delay elements 15 and 70. In the signal change stage 20, the digitized audio signal is processed as a function of a change recommendation 41 generated by the signal analysis stage 40. The change recommendation 41 may also be to not change anything. The processed and possibly changed audio signal 21 at the output of stage 20 is reduced in a subsequent data reduction stage 30 with regard to the data rate available for transmission or storage. This data reduction is carried out as a function of an encoding recommendation 42 which is made available by the signal analysis stage 40. The encoded audio signal 31 at the output of stage 30 is fed to a data expansion stage 50 for use in a recursive control process, which will be described in greater detail below, in which the data-reduced audio signal is expanded so that, at the output of this stage 50, a digitized audio signal 51 is available, in a linearly coded 16 bit pulse code modulation. This re-expanded digital audio signal 51 is fed to the signal analysis stage 40. In addition, there are applied to the input of stage 40 the digitized audio signal 12 to be encoded as well as an information signal 32, supplied by the data reduction stage 30, concerning the data rate required for the encoding of the audio signal 12, with the data rate providing information on the existing code violations during the data reduction of the audio signal 12. Furthermore, stage 40 is fed a differential signal 13 which results from the generation of the difference between the re-expanded audio signal 51 and the audio signal 12 to be encoded. In order for the differential generation to relate to temporally synchronous audio signals, the audio signal 12 to be encoded is delayed by the amount $\Delta t_1$ in the delay stage 70 and is also fed to stage 40. Based on the information signal 32, the signal analysis stage 40 determines whether a code overload is present. A code overload is defined as a state in which the available capacity of a transmission or storage medium is not sufficient for the optimum transcoding of the audio signal. If such a code overload is present, the recursive control process is employed, with the input signals 12, 13 and 51 applied to the signal analysis stage 40 being examined with regard to possible signal changes as well as to encoding strategies. Possible signal change measures, or measures for changing the signal changes or criterion, that are features of the audio signal (unless the signal change measure indicates no change), communicated to the signal change stage 20 in the form of a change recommendation 41, limitation or a time behavior change such as a level change of the audio signal to be encoded, which lead to a reduction of the data rate required in the data reduction stage 30 and, at the same time, to a minimum interference effect of the re-expanded audio signal 51. Apart from the bandwidth limitation and level change mentioned, further typical signal change measures include other spectral distribution changes such as frequency response changes (pre-emphasis), and other time behavior changes such as steeper or lesser signal amplitude changes, or signal repetitions in place of the actual signal, particularly for periodic or quasi-periodic signal characteristics of the audio signal. Simplification of the spatial imaging or distribution of multichannel audio signals, such as providing mono instead of stereo for the entire audio frequency range or for a part of the frequency range, may also be used as a signal change measure. A signal change measure selected by the signal analysis stage 40 is communicated to the signal change stage 20 in the form of a change recommendation 41. The signal analysis stage 40 also generates an encoding recommendation 42 which is communicated to the data reduction stage. The encoding recommendation 42 is selected from a table of distortion or interference effect patterns in the signal analysis stage 40 by using the change recommendation 41 generated there. The encoding recommendation 42 is used in the data reduction stage 30 for a transcoding of the audio signal to be encoded at a reduced bit rate so that the interference or distortion produced will be as small as possible. The recursive control process required for the signal analysis in stage 40 can also be carried out several times, if necessary, until a satisfactory result is achieved by the change and encoding recommendations 41, 42. As will be apparent from the foregoing, if a code overload condition is detected then at least one signal feature of the audio signal is recursively changed. For the final signal change and data reduction, the final change and encoding recommendations 43 or 44 are fed to a further signal change stage 22 or a further data reduction stage 33, which function in the same manner as the stages 20 and 30. Since a certain amount of time is necessary for the recursive control process, the audio signal 12 must be time-delayed by the amount $\Delta t_2$ before the final suboptimum transcoding by means of stage 15. The data-reduced audio signal 34 resulting from the data reduction stage 32 can be transmitted, e.g., to a channel encoder, which is not shown, for storage on a sound carrier or for the processing of a broadcast signal. During the encoding of the audio signal, code bits are assigned to the data-reduced encoded signal based on the recommended changes made to the digitized audio signal.

When very a low bit rate of the data-reduced audio signal is available, the purposeful change of the digital signal prior to encoding is effected so that the speech intelligibility of the audio signal is maintained or is improved, if possible. During a stereophonic encoding, or when two or more audio signals are encoded together or as a function of one another, the purposeful change of the various audio signals occurs prior to the data reduction/encoding of the signals, with the change being based on mutual level relationships of the audio signals. The selection of the particular encoding scheme and/or the particular purposeful change of the audio signal prior to encoding are/is respectively determined anew after short periodic time intervals.

The method according to the invention can also function without recursive control process if an internal examination of the audio signal 51 which has been data-reduced and re-expanded by the change and encoding recommendations 41 or 42 is dispensed with. The advantage related herewith of reduced physical intricacy (complexity), however, is gained at the expense of the achievable optimum of the suboptimum transcoding. If the recursive control process is dispensed with, the input signals 13 and 51 at the signal analysis stage 40, as well as the time-delayed audio signal 12, are deleted. The already encoded signal 31 represents the final encoded audio signal so that also the stages 15, 22 and 33 are not required. A further simplification of the method according to the invention is achieved by, in addition, dispensing with the continuously conducted signal analysis, by, e.g., setting the signal change stage 20 to a constant change and the data reduction stage 30 to a constant encoding recommendation.

It is understood that the signal processing that may have to be made in the signal change stage 20 can also be carried out prior to the analog/digital conversion of the analog audio signal 11. For this purpose, the stage 20 may be re-located so that it is connected in series before the analog/digital converter.

We claim:

1. A method of encoding an audio signal for transmission and/or for storage, the method comprising the steps of:

changing a digitized audio signal based on a selected signal changing criteria;

encoding the changed digitized audio signal for reducing an amount of data associated with the changed digitized audio signal based at least on an available data rate for transmitting and/or storing the audio signal;

evaluating the reduced-data audio signal for determining whether a code overload condition exists;

selecting another signal changing criteria if a code overload condition exists;

recursively changing a time behavior and/or a spectral distribution of the digitized audio signal based on the another signal changing criteria before the amount of data associated with the digitized audio signal is reduced so that deterioration of reduced-data audio signal is not perceptible when the recursively changed digitized audio signal is decoded after transmission and/or storage;

encoding the recursively changed digitized audio signal for reducing an amount of data associated with the recursively changed, digitized audio signal based at least on the available data rate; and transmitting and/or storing the recursively changed encoded reduced-data digitized audio signal.

2. The method according to claim 1, wherein the step of selecting another signal changing criteria comprises the steps of:

expanding the reduced-data digitized audio signal;

generating a difference signal between the digitized audio signal and the expanded digitized audio signal; and evaluating the digitized audio signal, the difference signal and the expanded digitized audio signal for selecting the another signal changing criteria.

3. The method according to claim 2, further comprising the steps of:

evaluating the digitized audio signal, the difference signal and the expanded digitized audio signal for selecting an encoding strategy for encoding the recursively changed digitized audio signal; and selecting the encoding strategy based on a table of interference effect patterns.

4. The method according to claim 3, further comprising the step of delaying the digitized audio signal for a predetermined period of time before recursively changing the digitized audio signal.

5. The method according to claim 2, wherein the another signal changing criteria includes at least one of a frequency response change, a temporal change, and a signal repetition in place of an actual signal.

6. The method according to claim 2, wherein the another signal changing criteria includes a simplification of a spatial imaging of multichannel audio signals when the audio signal comprises a plurality of audio signals.

7. The method according to claim 1, wherein when the audio signal is a stereophonic signal or two or more audio signals, at least one of the steps of changing the digitized audio signal and recursively changing the digitized audio signal is based on mutual level relationships of the audio signals.

8. The method according to claim 1, wherein when the available bit rate is a low bit rate, at least one of the steps of changing the digitized audio signal and recursively changing the digitized audio signal causes a speech intelligibility of the audio signal to at least be maintained or to be improved.

9. The method according to claim 1, wherein at least one of the steps of encoding comprises the step of assigning code bits based on a previous change of the digitized audio signal.

10. A method according to claim 1, further comprising the step of repeating the steps of the method after a predetermined period of time.

* * * * *